US012777193B2

(12) United States Patent
Budagavi et al.

(10) Patent No.: US 12,777,193 B2
(45) Date of Patent: Oct. 27, 2026

(54) ADAPTIVE LOOP FILTERING (ALF) FOR VIDEO CODING

(71) Applicant: Texas Instruments Incorporated, Dallas, TX (US)

(72) Inventors: Madhukar Budagavi, Plano, TX (US); Minhua Zhou, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 90 days.

(21) Appl. No.: 18/731,654

(22) Filed: Jun. 3, 2024

(65) Prior Publication Data

US 2024/0348838 A1 Oct. 17, 2024

Related U.S. Application Data

(63) Continuation of application No. 17/592,981, filed on Feb. 4, 2022, now Pat. No. 12,003,783, which is a continuation of application No. 16/889,869, filed on Jun. 2, 2020, now Pat. No. 11,277,645, which is a continuation of application No. 13/720,995, filed on Dec. 19, 2012, now Pat. No. 10,708,622.

(60) Provisional application No. 61/587,032, filed on Jan. 16, 2012, provisional application No. 61/578,066, filed on Dec. 20, 2011.

(51) Int. Cl.
*H04N 19/82* (2014.01)
*H04N 19/46* (2014.01)
*H04N 19/86* (2014.01)

(52) U.S. Cl.
CPC ............ *H04N 19/82* (2014.11); *H04N 19/46* (2014.11); *H04N 19/86* (2014.11)

(58) Field of Classification Search
None
See application file for complete search history.

(56) References Cited

U.S. PATENT DOCUMENTS

2004/0076237 A1 4/2004 Kadono et al.
2011/0249725 A1 10/2011 Auyeung et al.
2011/0274158 A1 11/2011 Fu et al.
2011/0305274 A1 12/2011 Fu et al.
2012/0082241 A1 4/2012 Tsai et al.
2012/0082244 A1 4/2012 Chen et al.
2012/0177104 A1 7/2012 Budagavi et al.
2013/0044809 A1* 2/2013 Chong .................. H04N 19/85 375/E7.076

(Continued)

OTHER PUBLICATIONS

"Adaptive (Wiener) Filter for Video Compression", COM16-C437R1-E, International Telecommunication Union (ITU)—Telecommunication Standardization Sector, Study Group 16, Contribution 437, Question 6/16, pp. 1-7, Apr. 2008.

(Continued)

*Primary Examiner* — Christopher Braniff
(74) *Attorney, Agent, or Firm* — Carl G. Peterson; Frank D. Cimino

(57) ABSTRACT

A method for adaptive loop filtering of a reconstructed picture in a video encoder is provided that includes determining whether or not sample adaptive offset (SAO) filtering is applied to the reconstructed picture, and using adaptive loop filtering with no offset for the reconstructed picture when the SAO filtering is determined to be applied to the reconstructed picture.

20 Claims, 5 Drawing Sheets

(56) References Cited

U.S. PATENT DOCUMENTS

| | | | | |
|---|---|---|---|---|
| 2014/0010278 | A1* | 1/2014 | Lou | H04N 19/61 375/240.02 |
| 2014/0294068 | A1 | 10/2014 | Andersson et al. | |
| 2015/0350685 | A1* | 12/2015 | Lee | H04N 19/14 375/240.12 |

OTHER PUBLICATIONS

"Adaptive Loop Filter for Improving Coding Efficiency", COM16-C402-E, International Telecommunication Union (ITU) Telecommunication Standardization Sector, Study Group 16, Contribution 402, Question 6/16, pp. 1-3, Apr. 2008.

"Quadtree-Based Adaptive Loop Filter", COM16-C181-E, International Telecommunication Union (ITU)—Telecommunication Standardization Sector, Study Group 16, Contribution 181, Question 6/16, pp. 1-4, Jan. 2009.

"TMS320DM6467 Digital Media System-on-Chip", SPRS403G, Texas Instruments Incorporated, Dec. 2007, revised Oct. 2010, pp. 1-355.

Akira Minezawa et al., "Removing DC Component of ALF Filter Coefficients", JCTVC-G445, Joint Collaborative Team on Video Coding (JCT-VC) of ITU-T SG16 WP3 and ISO/IEC JTC1/SC29/WG11, pp. 1-3, Nov. 21-30, 2011, Geneva, Switzerland.

Benjamin Bross et al., "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-259, Nov. 21-30, 2011, Geneva, Switzerland.

Benjamin Bross et al., "High Efficiency Video Coding (HEVC) Text Specification Draft 7", JCTCV-11003_d1, Joint Collaborative Team on Video Coding (JCT-VC) of ITU-T SG16 WP3 and ISO/IEC JTC1/SC29/WG11, pp. 1-272, Apr. 27-May 7, 2012, Geneva, Switzerland.

Benjamin Bross et al., "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, pp. 1-260, Jul. 11-20, 2012, Stockholm, Sweden.

Benjamin Bross et al., "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-229, Jul. 14-22, 2011, Torino, Italy.

Benjamin Bross et al., "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-237, Nov. 21-30, 2011, Geneva, Switzerland.

Marta Karczewicz et al., "A Hybrid Video Coder Based on Extended Macroblock Sizes, Improved Interpolation and Flexible Motion Representation", IEEE Transactions on Circuits and Systems for Video Technology, vol. 20, Issue 12. pp. 1698-1708, Dec. 2010.

Takeshi Chujoh et al., "Block-Based Adaptive Loop Filter", VCEG-AI18, International Telecommunication (ITU)—Telecommunication Standardization Sector, Study Group 16, Question 6, pp. 1-7, Jul. 16-18, 2008, Berlin, Germany.

Thomas Wiegand et al., "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.

Thomas Wiegand et al., "WD2: Working Draft 2 of High-Efficiency Video Coding" JCTVC-D503, Joint Collaborative Team on Video Coding (JCT-VC) of ITU-T SG16 WP3 and ISO/IEC JTC1/SC29/WG11, pp. 1-155, Jan. 20-28, 2011, Daegu, Korea.

* cited by examiner

ADAPTIVE LOOP FILTERING (ALF) FOR VIDEO CODING

CROSS-REFERENCE TO RELATED APPLICATIONS

This application is a continuation of U.S. application Ser. No. 17/592,981, filed Feb. 4, 2022, currently pending and scheduled to grant as U.S. Pat. No. 12,003,783 on Jun. 4, 2024, which is a continuation of U.S. application Ser. No. 16/889,869, filed Jun. 2, 2020 (now U.S. Pat. No. 11,277,645), which is a continuation of U.S. application Ser. No. 13/720,995, filed Dec. 19, 2012, which claims benefit of U.S. Provisional Application No. 61/578,066, filed Dec. 20, 2011, and U.S. Provisional Application No. 61/587,032, filed Jan. 16, 2012, which are incorporated herein by reference in their entirety.

BACKGROUND OF THE INVENTION

Field of the Invention

Embodiments of the present invention generally relate to adaptive loop filtering for video coding.

Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% reduction in bit rate (at similar visual quality) over the current standard, H.264/AVC, and intended to support larger resolutions and higher frame rates. To address these requirements, HEVC utilizes larger block sizes than H.264/AVC. In HEVC, the largest coding unit (LCU) can be up to 64×64 in size, while in H.264/AVC, the macroblock size is fixed at 16×16.

In a coding scheme that uses block-based prediction, transform coding, and quantization, some characteristics of the compressed video data may differ from the original video data. For example, discontinuities referred to as blocking artifacts can occur in the reconstructed signal at block boundaries. Quantization errors, ringing artifacts, and high frequency noise can also occur. Further, the intensity of the compressed video data may be shifted. Such intensity shift may also cause visual impairments or artifacts. To help reduce such artifacts in decompressed video, three in-loop filters have been proposed for the emerging HEVC standard: a deblocking filter to reduce blocking artifacts, a sample adaptive offset filter (SAO) to reduce distortion caused by intensity shift and high frequency noise, and an adaptive loop filter (ALF) to minimize the mean squared error (MSE) between reconstructed video and original video

SUMMARY

Embodiments of the present invention relate to apparatus and methods adaptive loop filtering in video coding. In one aspect, a method for adaptive loop filtering of a reconstructed picture in a video encoder, wherein parameters of an adaptive loop filter include a plurality of coefficients and an offset, is provided that includes determining whether or not sample adaptive offset (SAO) filtering is applied to the reconstructed picture and using adaptive loop filtering with no offset for the reconstructed picture when the SAO filtering is determined to be applied to the reconstructed picture.

In one aspect, a method for adaptive loop filtering of a reconstructed picture in a video decoder, wherein parameters of an adaptive loop filter include a plurality of coefficients and an offset, is provided that includes determining whether or not adaptive loop filtering with no offset is to be applied to the reconstructed picture, decoding filter parameters for an adaptive loop filter wherein a value of the offset is not included in the filter parameters when adaptive loop filtering with no offset is to be applied, and applying the adaptive loop filter to at least some pixels of a portion of the reconstructed picture using the decoded filter parameters, wherein a value of the offset is assumed to be zero.

In one aspect, an apparatus configured for adaptive loop filtering of a reconstructed picture in a video encoder, wherein parameters of an adaptive loop filter comprise a plurality of coefficients and an offset, the apparatus including means for determining whether or not sample adaptive offset (SAO) filtering is applied to the reconstructed picture, means for using adaptive loop filtering with no offset for the reconstructed picture when the SAO filtering is determined to be applied to the reconstructed picture, and means for using adaptive loop filtering with a computed offset for the reconstructed picture when the SAO filtering is determined to not be applied.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
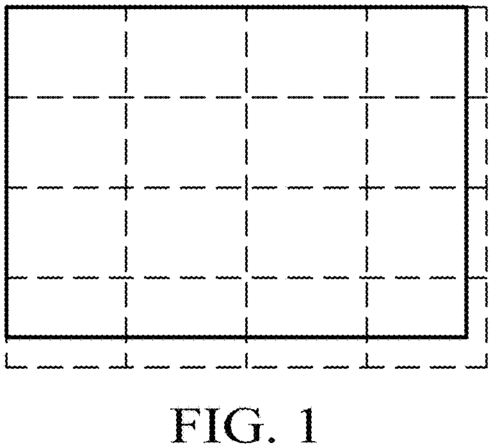
FIG. 1 illustrates filtering regions of a picture in region-based adaptive loop filtering (ALF)

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit. In recent specifications, the size of a square transform unit may be 4×4, 8×8, 16×16, and 32×32 and the size of a non-square transform may be16×4, 4×16, 32×8, and 8×32. The sizes of the transform units and prediction units for a CU are determined by the video encoder during prediction based on minimization of rate/distortion costs.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), B. Bross, et al., "High Efficiency Video Coding (HEVC) Text Specification Draft 7," JCTVC-I1003_d0, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), and B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8").

In general, in adaptive loop filtering (ALF), symmetric 2D finite impulse response (FIR) filters are applied to blocks of a reconstructed picture to minimize the error between the original input blocks and the reconstructed blocks. The shape of a filter may be diamond, circle, star, cross, or any other general shape bounded by a (2V+1)×(2H+1) rectangle where V is the vertical dimension of the filter and H is the horizontal dimension of the filter. In practice, the filter shape or shapes to be used are defined by the video code standard, e.g., HEVC. The coefficients of the filters to be applied to each reconstructed picture are determined by the encoder and signaled to the decoder.

Several different approaches have been proposed for ALF. The original ALF concept is explained in more detail in Y. Chiu and L. Xu, "Adaptive (Wiener) Filter for Video Compression," ITU-T SG16 Contribution, C437, Geneva, CH, April 2008. As originally proposed in Y. Chiu and L. Xu, "Adaptive (Wiener) Filter for Video Compression," ITU-T SG16 Contribution, C437, Geneva, CH, April 2008, ALF used square filters and was carried out on entire deblocked pictures. Block-based ALF, described in T. Chujoh, et al., "Block-based Adaptive Loop Filter," ITU-T SG16 Q.6 Document, VCEG-A118, Berlin, DE, July 2008, has also proposed in which ALF could be enabled and disabled on a block, i.e., coding unit, basis. In block-based ALF, the encoder signals to the decoder the map of blocks of a deblocked picture on which ALF is to be applied.

A further refinement to block-based ALF, quadtree adaptive loop filtering in which the map of blocks is signaled using a quadtree, has been proposed in T. Chujoh, et al., "Quadtree-based Adaptive Loop Filter," ITU-T SG16 Contribution, C181, January 2009. The use of diamond shaped rather than square shaped ALF filters has also been proposed to reduce computational complexity. Diamond shaped ALF filters for luma components are described in M. Karczewicz, et. al., "A Hybrid Video Coder Based on Extended Macroblock Sizes, Improved Interpolation, and Flexible Motion Representation," IEEE Trans. on Circuits and Systems for Video Technology, pp. 1698-1708, Vol. 20, No. 12, December 2010. Other refinements to ALF have been proposed in M. Budagavi, et al, "Reduced Complexity Adaptive Loop Filter (ALF) for Video Coding," U.S. Patent Application No. 20120177104, filed Jan. 11, 2012.

Region-based ALF has also been proposed. As illustrated in FIG. 1, in region-based ALF, a picture is divided into 16 LCU-aligned regions. These regions may be referred to as filtering regions herein. In FIG. 1, the dashed lines delineate the ALF filtering regions and the solid lines delineate the picture. An LCU-aligned region of a picture is a region in which the region boundaries are also LCU boundaries. It is recognized that the dimensions of a picture and the dimensions of an LCU may not allow a picture to be evenly divided into LCUs. As illustrated in FIG. 1, there may be blocks at the bottom of the picture or the right side of the picture that are smaller than the actual LCU size, i.e., partial LCUs. These partial LCUs are mostly treated as if they were full LCUs and are referred to as LCUs.

Figure 2:
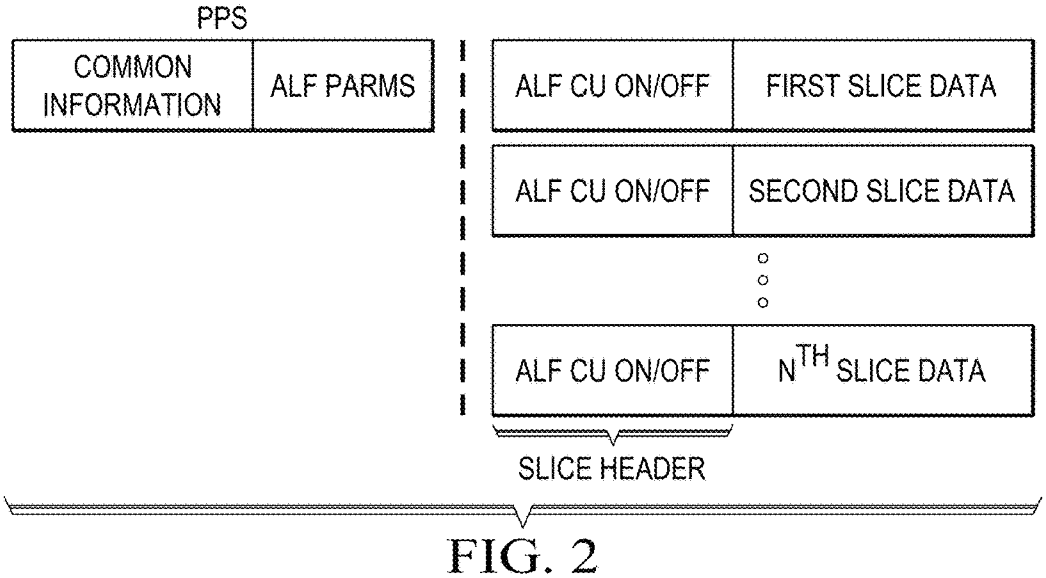
FIG. 2 (PRIOR ART)
FIG. 2 illustrates prior art signaling of ALF parameters and ALF coding unit flags in region-based ALF.

For each picture, the encoder determines filter parameters for each region and signals those parameters to the decoder. In some region-based ALF approaches, the encoder may also select a filter shape for a picture from multiple filter shapes. As part of determining the filter parameters, the encoder may apply a coding cost versus error decrease analysis to decide whether or not a particular region is to be filtered. If a region is not to be filtered, no parameters are signaled for that region. Further, one or more regions may use the same parameters. Thus, the encoder may signal a maximum of 16 sets of parameters and may signal fewer. The encoder may also analyze application of the filtering at the CU level within a region and turn the filtering on and off at the CU level. FIG. 2 illustrates a recently proposed signaling of the ALF parameters and CU level information from the encoder to the decoder. As shown, the filter parameters for a picture are signaled in the picture parameter set (PPS) and the application of filtering at the CU level is signaled in each slice header.

For simplicity of explanation herein, unless otherwise stated, the above described region-based ALF with one 10-tap filter is assumed. One of ordinary skill in the art, having benefit of this disclosure, will understand that techniques for adaptive loop filtering with no offset described herein may be used in other ALF approaches, with other filter sizes, and/or with multiple filter shapes.

Figure 3:
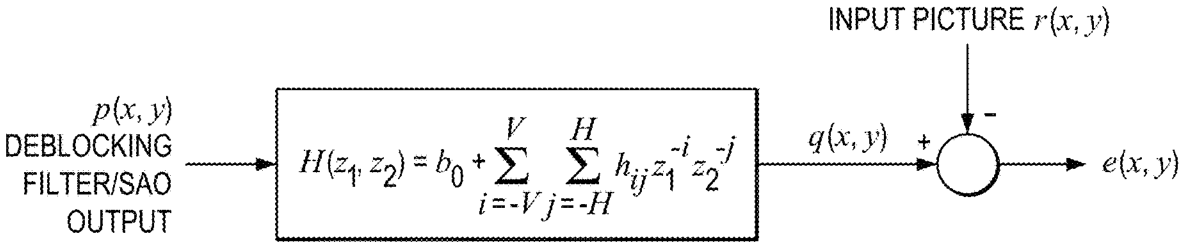
FIG. 3 is an overview of ALF.

FIG. 3 is an overview of adaptive loop filtering (ALF). A symmetric FIR filter $H(z_1,z_2)$ may be applied to reconstructed pixels p(x,y) of regions of a reconstructed picture after application of a deblocking filter and a sample adaptive offset (SAO) filter to generate filtered pixels q(x, y). As previously mentioned, the shape of a filter may be diamond, circle, star, cross, or any other general shape bounded by a (2V+1)×(2H+1) rectangle where V is the vertical dimension of the filter and H is the horizontal dimension of the filter.

The filter parameters are the coefficients $h_{ij}$ and an offset $b_0$. The offset is applied to compensate for intensity shifts in a picture (which may vary from region to region) that may be introduced by the block-based coding process. The filtered output q(x, y) for a pixel p(x,y) is given by $$q(x, y) = \sum_{i=-V}^{V} \sum_{j=-H}^{H} h_{ij} p(x-i, y-j) + b_0$$

The filter parameters for a region are determined using a Weiner filtering technique in which the objective is to determine parameters such that the mean squared error between the original input pixel and the filtered reconstructed pixel is minimized, i.e., $$\{h_{ij} b_0\} = \arg\min E\{e^2(x, y)\}$$

where the error is given by $$e(x, y) = r(x, y) - q(x, y)$$

and r(x,y) is the original pixel value from the input picture.

Figure 4:
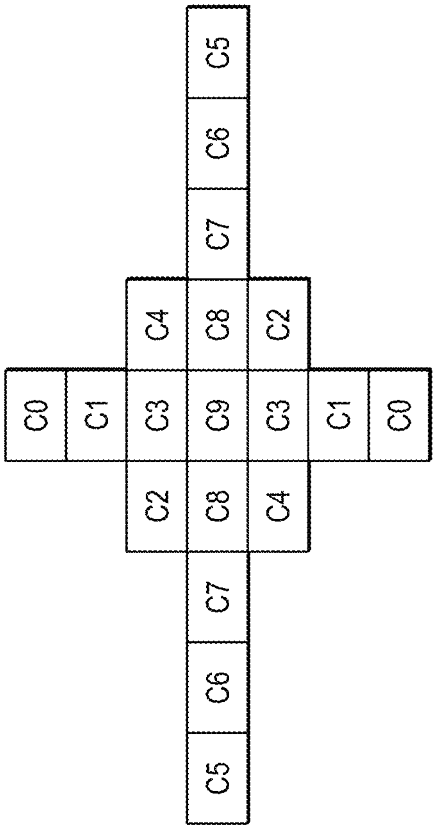
FIG. 4 shows an example 10-tap symmetric finite impulse response (FIR) filter.

The solution of the two-dimensional (2D) problem of FIG. 3 can be mapped to a one-dimensional (1D) problem by appropriately scanning the two-dimensional filter grid (along with averaging of pixels when the filter is symmetric) to form 1D vectors. This mapping is explained using the example symmetric 10 tap 2D finite impulse response (FIR) filter of FIG. 4. The notation of $c_i$ is used to denote filter coefficients instead of $h_{ij}$ to illustrate the symmetry in the filter.

The output q(x, y) of this example filter for a pixel p(x,y) is given by $$q(x, y) = b_0 + c_0(p(x, y-3) + p(x, y+3)) + c_1(p(x, y-2) + p(x, y+2)) + \ldots + c_9 p(x, y)$$

where $c_i$, i=0 . . . 9 is a filter coefficient. Let $$p_0(x, y) = (p(x, y-3) + p(x, y+3))$$
$$p_1(x, y) = (p(x, y-2) + p(x, y+2))$$
$$\vdots$$
$$p_9(x, y) = p(x, y)$$

The filtering computation then reduces to $$q(x, y) = b_0 + \sum_{i=0}^{9} c_i p_i(x, y).$$

As previously mentioned, the filter parameters are determined using a standard Weiner filtering technique in which the objective is to determine parameters such that the mean squared error between the original input pixel and the filtered reconstructed pixel is minimized, i.e., to find values for the coefficients $c_i$ and the offset $b_0$ that minimize $\Sigma_{x,y}(q(x,y)-r(x,y))^2$.

Using the standard Weiner filtering technique, the parameter estimation may be expressed as:

$$\begin{bmatrix} R_p[0,0] & R_p[0,1] & \ldots & R_p[0,N] & m_p[0] \\ R_p[1,0] & R_p[1,1] & \ldots & R_p[1,N-1] & m_p[1] \\ \vdots & \vdots & \ddots & \vdots & \vdots \\ R_p[N,0] & R_p[N,1] & \ldots & R_p[N,N] & m_p[N] \\ m_p[0] & m_p[1] & \ldots & m_p[N] & 1 \end{bmatrix} \begin{bmatrix} c_0 \\ c_1 \\ \vdots \\ c_N \\ b_0 \end{bmatrix} = \begin{bmatrix} R_{pr}[0] \\ R_{pr}[1] \\ \vdots \\ R_{pr}[N] \\ m_r \end{bmatrix} \quad \text{(Eq. 1)}$$

where $$m_p[i] = \sum_{x,y} p_i(x, y)$$

$$R_p[i, j] = \sum_{x,y} p_i(x, y) p_j(x, y)$$

$$m_r = \sum_{x,y} r(x, y)$$

$$R_{pr}[i] = \sum_{x,y} p_i(x, y) r(x, y)$$

$R_p$ is the auto-correlation of $p_i(x,y)$ and $R_{pr}$ is the cross-correlation of $p_i$ with r (the original signal). N+1 is the number of filter taps. For example, for the filter of FIG. 4, N=9. Computation of the solution involves matrix inversion using Cholesky decomposition or other techniques for symmetric matrices. If the matrix size is M×M, the computation complexity is $O(M^3)$ and the memory required is $O(M^2)$. The application of the filter with the determined parameters may be computed as per $$q(x, y) = b_0 + \sum_{i=0}^{N} c_i p_i(x, y). \quad \text{(Eq. 2)}$$

As previously mentioned, a sample adaptive offset (SAO) in-loop filter is one of the in-loop filters proposed in the emerging HEVC standard. SAO, if used, may be applied to reconstructed pixels after application of a deblocking filter and before application of ALF. In general, SAO involves adding an offset to compensate for intensity shift directly to a reconstructed pixel. The value of the offset depends on the local characteristics surrounding the pixel, i.e., edge direction/shape and/or pixel intensity level. There are two techniques that may be used for determining offset values: band offset (BO) and edge offset (EO). Additional details regarding the various proposals for SAO may be found, for example, in the previously mentioned working drafts of the HEVC specification.

The offset added to a reconstructed pixel by SAO and the offset added to a reconstructed pixel by ALF are both intended to compensate for intensity shift. Accordingly, when SAO is applied prior to ALF, the ALF offset $b_0$ can be assumed to be zero. Some embodiments of the invention provide for ALF with no offset when SAO is also used, i.e., the offset for ALF is assumed to be zero. If SAO is disabled, ALF with an offset is used. The assumption that the offset $b_0$ is zero results in a simplification of the Weiner filter estimation in the encoder. That is, with no need to determine an offset, the parameter estimation may be expressed as $$\begin{bmatrix} R_p[0,0] & R_p[0,1] & \dots & R_p[0,N] & m_p[0] \\ R_p[1,0] & R_p[1,1] & \dots & R_p[1,N-1] & m_p[1] \\ \vdots & \vdots & \ddots & \vdots & \vdots \\ R_p[N,0] & R_p[N,1] & \dots & R_p[N,N] & m_p[N] \end{bmatrix} \begin{bmatrix} c_0 \\ c_1 \\ \vdots \\ c_N \end{bmatrix} = \begin{bmatrix} R_{pr}[0] \\ R_{pr}[1] \\ \vdots \\ R_{pr}[N] \end{bmatrix} \quad \text{(Eq. 3)}$$

If N=9, then the solution of the above equation involves inversion of a 10×10 matrix as compared to inversion of an 11×11 matrix is the offset is also determined. Further, the addition of the offset when the filter is applied in the encoder and decoder may be eliminated, i.e., the application of the filter may be computed as per $$q(x, y) = \sum_{i=0}^{N} c_i p_i(x, y). \quad \text{(Eq. 4)}$$

The previously described signaling of filter parameters for region-based ALF causes a full picture delay in the encoder before data can be transmitted since the filter parameters for the entire picture are signaled in the picture parameter set. Some embodiments of the invention provide alternatives for signaling the filter parameters that reduce this delay.

Figure 5:
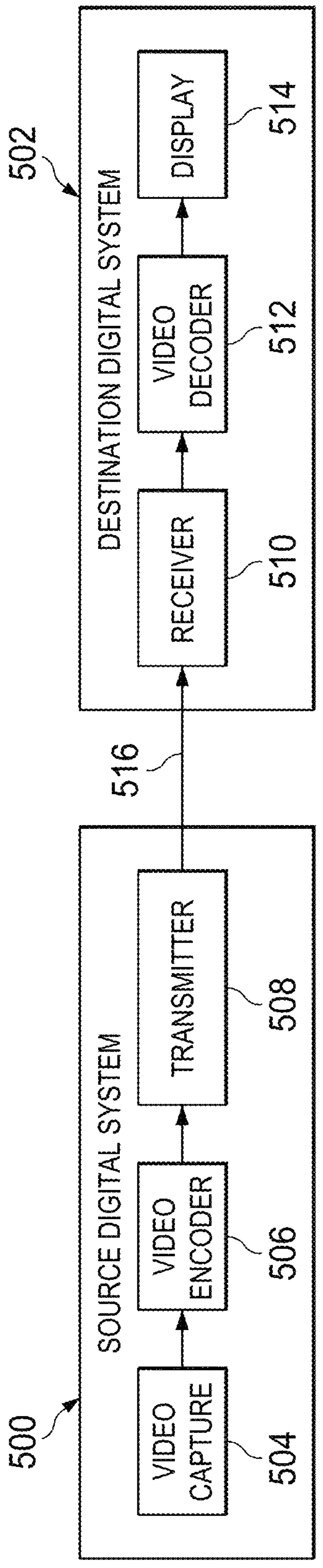
FIG. 5 is a block diagram of a digital system.

FIG. 5 shows a block diagram of a digital system that includes a source digital system 500 that transmits encoded video sequences to a destination digital system 502 via a communication channel 516. The source digital system 500 includes a video capture component 504, a video encoder component 506, and a transmitter component 508. The video capture component 504 is configured to provide a video sequence to be encoded by the video encoder component 506. The video capture component 504 may be, for example, a video camera, a video archive, or a video feed from a video content provider. In some embodiments, the video capture component 504 may generate computer graphics as the video sequence, or a combination of live video, archived video, and/or computer-generated video.

The video encoder component 506 receives a video sequence from the video capture component 504 and encodes it for transmission by the transmitter component 508. The video encoder component 506 receives the video sequence from the video capture component 504 as a sequence of pictures, divides the pictures into largest coding units (LCUs), and encodes the video data in the LCUs. As part of the encoding process, the video encoder component 506 may perform an embodiment of adaptive loop filtering and/or signaling of ALF parameters as described herein. An embodiment of the video encoder component 506 is described in more detail herein in reference to FIG. 6.

The transmitter component 508 transmits the encoded video data to the destination digital system 502 via the communication channel 516. The communication channel 516 may be any communication medium, or combination of communication media suitable for transmission of the encoded video sequence, such as, for example, wired or wireless communication media, a local area network, or a wide area network.

The destination digital system 502 includes a receiver component 510, a video decoder component 512 and a display component 514. The receiver component 510 receives the encoded video data from the source digital system 500 via the communication channel 516 and provides the encoded video data to the video decoder component 512 for decoding. The video decoder component 512 reverses the encoding process performed by the video encoder component 506 to reconstruct the LCUs of the video sequence. As part of the decoding process, the video decoder component 512 may perform an embodiment of adaptive loop filtering according to signaling from the encoder as described herein. An embodiment of the video decoder component 512 is described in more detail below in reference to FIG. 7.

The reconstructed video sequence is displayed on the display component 514. The display component 514 may be any suitable display device such as, for example, a plasma display, a liquid crystal display (LCD), a light emitting diode (LED) display, etc.

In some embodiments, the source digital system 500 may also include a receiver component and a video decoder component and/or the destination digital system 502 may include a transmitter component and a video encoder component for transmission of video sequences both directions for video steaming, video broadcasting, and video telephony. Further, the video encoder component 506 and the video decoder component 512 may perform encoding and decoding in accordance with one or more video compression standards. The video encoder component 506 and the video decoder component 512 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 6:
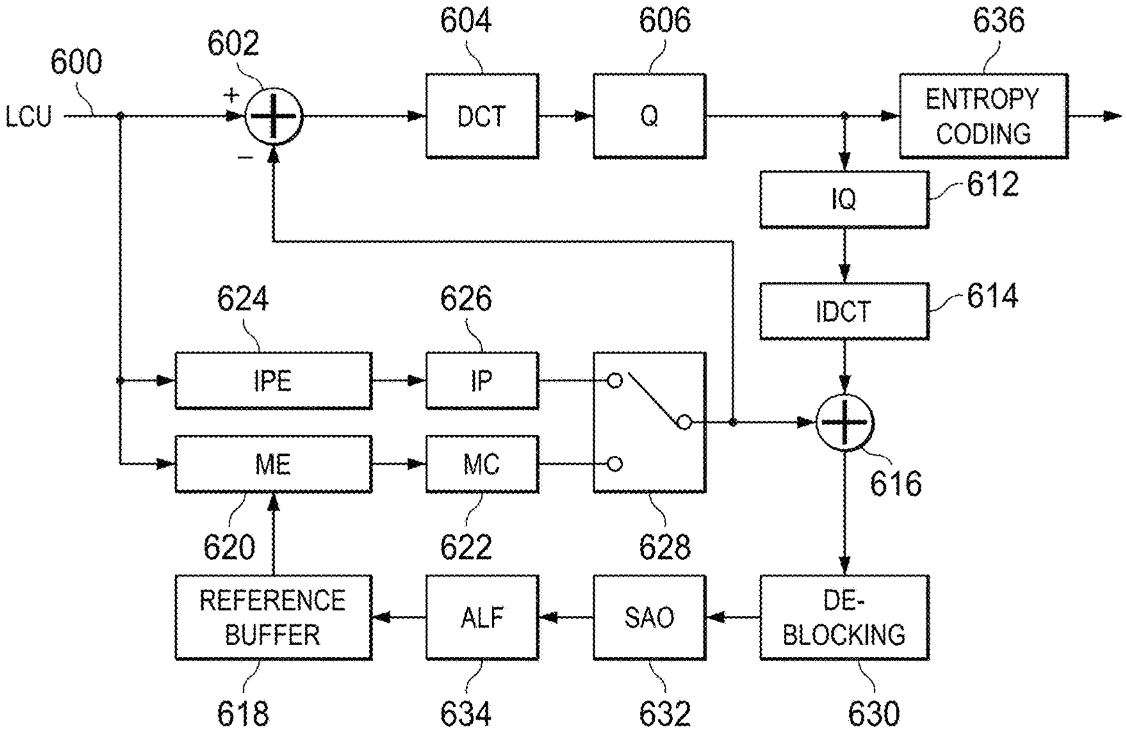
FIG. 6 is a block diagram of a video encoder.

FIG. 6 is a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU processing receives LCUs 600 of the input video sequence from the coding control component and encodes the LCUs 600 under the control of the coding control component to generate the compressed video stream. The LCUs 600 in each picture are processed in row order. The LCUs 600 from the coding control component are provided as one input of a motion estimation component (ME) 620, as one input of an intra-prediction estimation component (IPE) 624, and to a positive input of a combiner 602 (e.g., adder or subtractor or the like). Further, although not specifically shown, the prediction mode of each picture as selected by the coding control component is provided to a mode decision component 628 and the entropy coding component 636.

The storage component 618 provides reference data to the motion estimation component 620 and to the motion compensation component 622. The reference data may include one or more previously encoded and decoded pictures, i.e., reference pictures.

The motion estimation component 620 provides motion data information to the motion compensation component 622 and the entropy coding component 636. More specifically, the motion estimation component 620 performs tests on CUs in an LCU based on multiple inter-prediction modes (e.g., skip mode, merge mode, and normal or direct inter-prediction), PU sizes, and TU sizes using reference picture data from storage 618 to choose the best CU partitioning, PU/TU partitioning, inter-prediction modes, motion vectors, etc. based on coding cost, e.g., a rate distortion coding cost. To perform the tests, the motion estimation component 620 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 620 provides the motion vector (MV) or vectors and the prediction mode for each PU in the selected CU partitioning to the motion compensation component (MC) 622.

The motion compensation component 622 receives the selected inter-prediction mode and mode-related information from the motion estimation component 620 and generates the inter-predicted CUs. The inter-predicted CUs are provided to the mode decision component 628 along with the selected inter-prediction modes for the inter-predicted PUs and corresponding TU sizes for the selected CU/PU/TU partitioning. The coding costs of the inter-predicted CUs are also provided to the mode decision component 628.

The intra-prediction estimation component 624 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 624 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 624 provides the selected intra-prediction modes for the PUs, and the corresponding TU sizes for the selected CU partitioning to the intra-prediction component (IP) 626. The coding costs of the intra-predicted CUs are also provided to the intra-prediction component 626.

The intra-prediction component 626 (IP) receives intra-prediction information, e.g., the selected mode or modes for the PU(s), the PU size, etc., from the intra-prediction estimation component 624 and generates the intra-predicted CUs. The intra-predicted CUs are provided to the mode decision component 628 along with the selected intra-prediction modes for the intra-predicted PUs and corresponding TU sizes for the selected CU/PU/TU partitioning. The coding costs of the intra-predicted CUs are also provided to the mode decision component 628.

The mode decision component 628 selects between intra-prediction of a CU and inter-prediction of a CU based on the intra-prediction coding cost of the CU from the intra-prediction component 626, the inter-prediction coding cost of the CU from the motion compensation component 622, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 636.

The output of the mode decision component 628, i.e., the predicted PUs, is provided to a negative input of the combiner 602 and to the combiner 638. The associated transform unit size is also provided to the transform component 604. The combiner 602 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 604 performs block transforms on the residual CUs to convert the residual pixel values to transform coefficients and provides the transform coefficients to a quantize component 606. More specifically, the transform component 604 receives the transform unit sizes for the residual CU and applies transforms of the specified sizes to the CU to generate transform coefficients. Further, the quantize component 606 quantizes the transform coefficients based on quantization parameters (QPs) and quantization matrices provided by the coding control component and the transform sizes and provides the quantized transform coefficients to the entropy coding component 636 for coding in the bit stream.

The entropy coding component 636 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, flags indicating the CU/PU/TU partitioning of an LCU, the prediction modes for the CUS, and the quantized transform coefficients for the CUs. The entropy coding component 636 also codes relevant data for in-loop filtering such as ALF parameters and ALF CU-level on/off flags, and SAO parameters, e.g., filter type, on/off flags, and offsets, as needed.

The LCU processing component 642 includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 612, which outputs a reconstructed version of the transform result from the transform component 604. The dequantized transform coefficients are provided to the inverse transform component (IDCT) 614, which outputs estimated residual information representing a reconstructed version of a residual CU. The inverse transform component 614 receives the transform unit size used to generate the transform coefficients and applies inverse transform(s) of the specified size to the transform coefficients to reconstruct the residual values. The inverse transform component 614 may perform the inverse transform computations using the same unified forward and inverse transform architecture as the transform component 604. The reconstructed residual CU is provided to the combiner 638.

The combiner 638 adds the original predicted CU to the residual CU to generate a reconstructed CU, which becomes part of reconstructed picture data. The reconstructed picture data is stored in a buffer (not shown) for use by the intra-prediction estimation component 624.

Various in-loop filters may be applied to the reconstructed picture data to improve the quality of the reference picture data used for encoding/decoding of subsequent pictures. The in-loop filters may include a deblocking filter 630, a sample adaptive offset filter (SAO) 632, and an adaptive loop filter (ALF) 634. The in-loop filters 630, 632, 634 are applied to each reconstructed LCU in the picture and the final filtered reference picture data is provided to the storage component 618.

The ALF component 634 includes functionality to determine filter parameters, i.e., filter coefficient values and an offset value, for each of the 16 LCU-aligned regions of the reconstructed picture. As part of this determination, the ALF component 634 may decide that one or more of the regions are not to be filtered (in which case filter parameters are not signaled for such regions) and/or may turn ALF filtering on and off at the CU level. In some embodiments, when SAO filtering has been applied to the reconstructed picture, the offset for the ALF filter is assumed to be zero. In such embodiments, there is no need to determine the offset and the parameter estimation may be performed as per Eq. 3. If SAO filtering has not been applied to the reconstructed picture, the offset is determined along with the filter coefficients as per the parameter estimation of Eq. 1.

As previously described, in the prior art, each set of ALF filter parameters signaled to the decoder includes the coefficient values and the offset value. In some embodiments in which the offset is assumed to be zero, a flag indicating whether or not ALF with no offset is used is signaled, e.g., in the sequence parameter set, the picture parameter set, or at the slice level, and the offset value is not included in the ALF filter parameters signaled to the decoder. In some embodiments in which the offset is assumed to be zero, rather than explicitly signaling the use of ALF with no offset to the decoder, the offset in each signaled ALF filter parameter set is set to zero. In such embodiments, the decoder operates the same way for both ALF in which the offsets are computed and ALF in which the offsets are assumed to be zero.

In some embodiments, the encoder may signal the ALF parameters for a picture at the PPS level as previously described in reference to FIG. 2. In some embodiments, the encoder may signal the ALF parameters for each row of filtering regions rather than at the picture level. For example, referring to FIG. 1, the ALF component 634 may determine filter parameters for each of the four filtering regions in the first row of the picture. Note that there will be a maximum of four sets of filter parameters for the row and there may be fewer. Once the filter parameters are determined for that row, the encoder may cause the entropy coding component 636 to encode and output the data for these regions along with the filter parameters determined for the row of regions. The parameters may be output either prior to the encoded data of the regions or immediately following the encoded data of the regions. This process is repeated for each row of filtering regions in the picture such that the ALF filter parameters for the rows of regions are interleaved with the encoded data of the rows of regions.

In some embodiments, the encoder may signal the ALF parameters for each region rather than at the picture level. For example, referring to FIG. 1, the ALF component 634 may determine filter parameters for the first filtering region in the first row of the picture. Once the filter parameters are determined for that region, the encoder may cause the entropy coding component 636 to encode and output the data for this region along with the filter parameters determined for the region (if any). The parameters may be output either prior to the encoded data of the region or immediately following the encoded data of the region. This process is repeated for each of the filtering regions in the picture such that the ALF filter parameters for the regions are interleaved with the encoded data of the regions.

Figure 7:
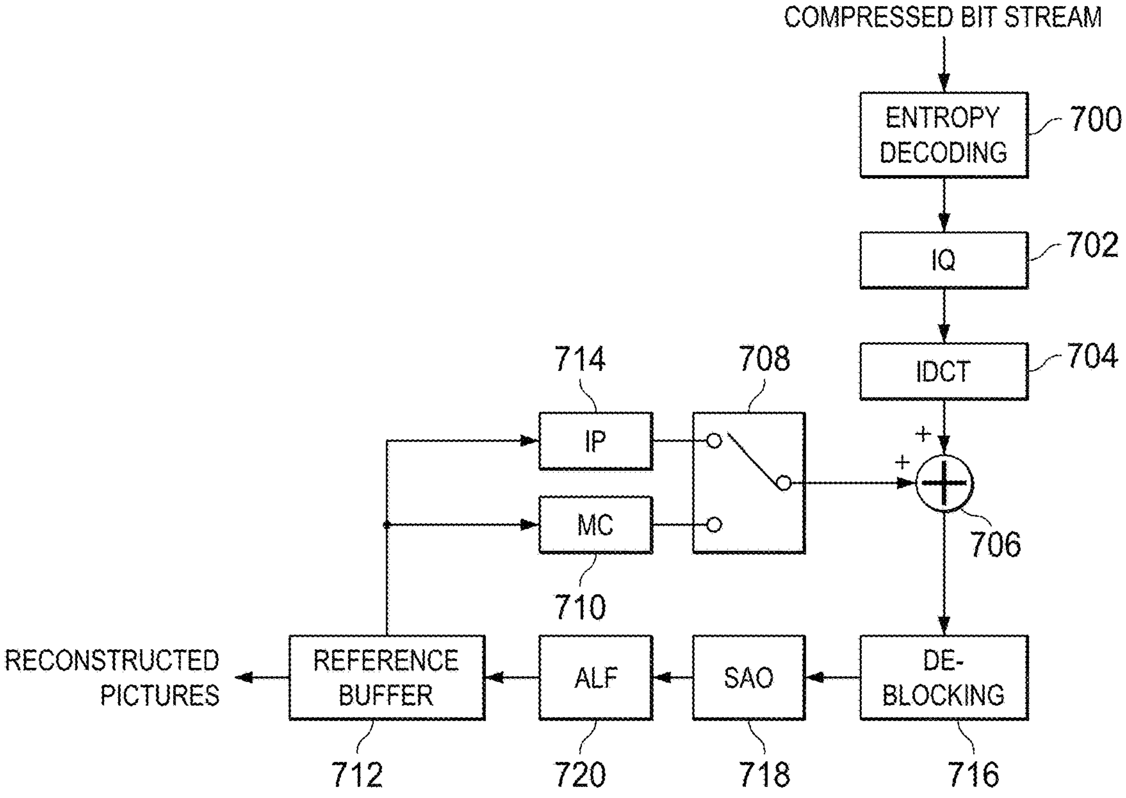
FIG. 7 is a block diagram of a video decoder.

FIG. 7 is a block diagram of an example video decoder. The entropy decoding component 700 receives an entropy encoded (compressed) video bit stream and reverses the entropy encoding using CABAC decoding to recover the encoded syntax elements, e.g., CU, PU, and TU structures of LCUs, quantized transform coefficients for CUs, motion vectors, prediction modes, in-loop filter parameters, etc. The decoded syntax elements are passed to the various components of the decoder as needed. For example, decoded prediction modes are provided to the intra-prediction component (IP) 714 or motion compensation component (MC) 710. If the decoded prediction mode is an inter-prediction mode, the entropy decoder 700 reconstructs the motion vector(s) as needed and provides the motion vector(s) to the motion compensation component 710. Further, decoded ALF filter parameters are passed to the ALF component 720.

In some embodiments, the entropy decoding component 700 decodes ALF filter parameters responsive to a signaled flag indicating whether or not ALF with no offset is used. In such embodiments, if the flag indicates that ALF with no offset is used, the entropy decoding component 700 decodes any ALF filter parameters present in the bit stream for the picture assuming that no offsets are included. Otherwise, the entropy decoding component 700 decodes the ALF filter parameters assuming offsets are included.

The inverse quantize component (IQ) 702 de-quantizes the quantized transform coefficients of the CUs. The inverse transform component 704 transforms the frequency domain data from the inverse quantize component 702 back to the residual CUs. That is, the inverse transform component 704 applies an inverse unit transform, i.e., the inverse of the unit transform used for encoding, to the de-quantized residual coefficients to produce reconstructed residual values of the CUs. The inverse transform component 704 may perform the inverse transform computations using the same unified forward and inverse transform architecture as the transform component 604 and the inverse transform component 614 of the video encoder of FIG. 6.

A residual CU supplies one input of the addition component 706. The other input of the addition component 706 comes from the mode switch 708. When an inter-prediction mode is signaled in the encoded video stream, the mode switch 708 selects predicted PUs from the motion compensation component 710 and when an intra-prediction mode is signaled, the mode switch selects predicted PUs from the intra-prediction component 714.

The motion compensation component 710 receives reference data from the storage component 712 and applies the motion compensation computed by the encoder and transmitted in the encoded video bit stream to the reference data to generate a predicted PU. That is, the motion compensation component 710 uses the motion vector(s) from the entropy decoder 700 and the reference data to generate a predicted PU.

The intra-prediction component 714 receives reconstructed samples from previously reconstructed PUs of a current picture from the storage component 712 and performs the intra-prediction computed by the encoder as signaled by an intra-prediction mode transmitted in the encoded video bit stream using the reconstructed samples as needed to generate a predicted PU.

The addition component 706 generates a reconstructed CU by adding the predicted PUs selected by the mode switch 708 and the residual CU. The output of the addition component 706, i.e., the reconstructed CUs, is stored in the storage component 712 for use by the intra-prediction component 714.

In-loop filters may be applied to reconstructed picture data to improve the quality of the decoded pictures and the quality of the reference picture data used for decoding of subsequent pictures. The in-loop filters are the same as those of the encoder, i.e., a deblocking filter 716, a sample adaptive offset filter (SAO) 718, and an adaptive loop filter (ALF) 720. The in-loop filters may be applied on an LCU-by-LCU basis and the final filtered reference picture data is provided to the storage component 712.

The ALF component 720 receives the decoded sets of filter parameters for the sixteen LCU-aligned regions of each picture, and, for each region, applies the filter with the parameters signaled for that region (if any) and according to any other ALF information signaled by the encoder, e.g., a CU-level map. As previously mentioned, in some embodiments, the encoder may use ALF with no offset and may signal to the decoder that ALF with no offset is used. In such embodiments, the ALF component 720 will not receive an explicitly encoded offset in each of the filter parameter sets, but rather assumes that the offset is zero. Thus, in such embodiments, the ALF component 720 may apply the filter with the appropriate signaled filter coefficients to a region without the extra step of adding an offset to each pixel (see Eq. 4).

Figure 8:
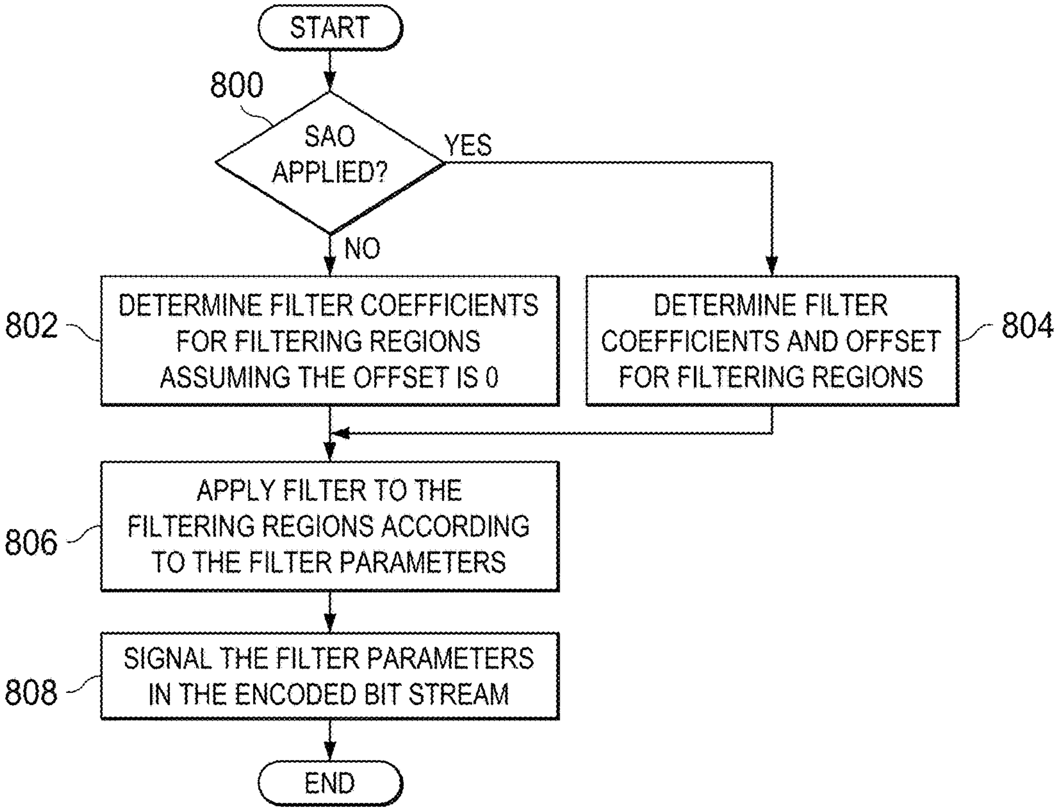
FIGS. 8 and 9 are flow diagrams of methods.

FIG. 8 is a flow diagram of a method for adaptive loop filtering of a reconstructed picture in an encoder. If SAO is not applied 800 to the reconstructed picture, filter parameters for each of the filtering regions are determined 804 for the ALF filter, the filter parameters for a filtering region including both the coefficient values of the filter and an offset. These parameters are determined as per the parameter estimation of Eq. 1. Up to sixteen sets of filter parameters may be determined, one for each filtering region. As previously mentioned, as part of the determination process, the encoder may decide that one or more regions are not to be filtered. In some embodiments, the encoder may also decide that one or more CUs within a region are not to be filtered.

If SAO is applied 800 to the reconstructed picture, filter parameters for each of the filtering regions are determined 802 for the ALF filter assuming that the offset is zero. These parameters are determined as per the parameter estimation of Eq. 3. Up to sixteen sets of filter parameters may be determined, one for each filtering region. As previously mentioned, as part of the determination process, the encoder may decide that one or more regions are not to be filtered. In some embodiments, the encoder may also decide that one or more CUs within a region are not to be filtered.

The filter is applied 806 to the filtering regions according to the filter parameters. More specifically, for each filtering region that the encoder determined should be filtered, the filter is applied to pixels of the region with the parameters determined for that region as per Eq. 2. In embodiments where the encoder determines whether or not individual CUs are to be filtered, the filter is applied to pixels in those CUs the encoder decides should be filtered. In some embodiments, if the filter coefficients are determined assuming the offset is zero, the addition of the offset is not performed as its value is zero (see Eq. 4).

The filter parameters are also signaled 808 in the encoded bit stream. In some embodiments, the filter parameters determined for the filtering regions are signaled in the picture parameter set as in the prior art. In some embodiments, the filter parameters are signaled for each row of filtering regions as previously described. In some embodiments, the filter parameters are signaled for each region as previously described. In some embodiments, the encoder may explicitly signal to the decoder that ALF with no offset is used when the SAO has been applied 800 and the filter parameters are determined 802 assuming the offset is zero. In such embodiments, the signaled filter parameters do not include offset values. In some embodiments, when the filter parameters are determined 802 assuming the offset is zero, the offset value for each set of signaled filter parameters is set to zero.

Figure 9:
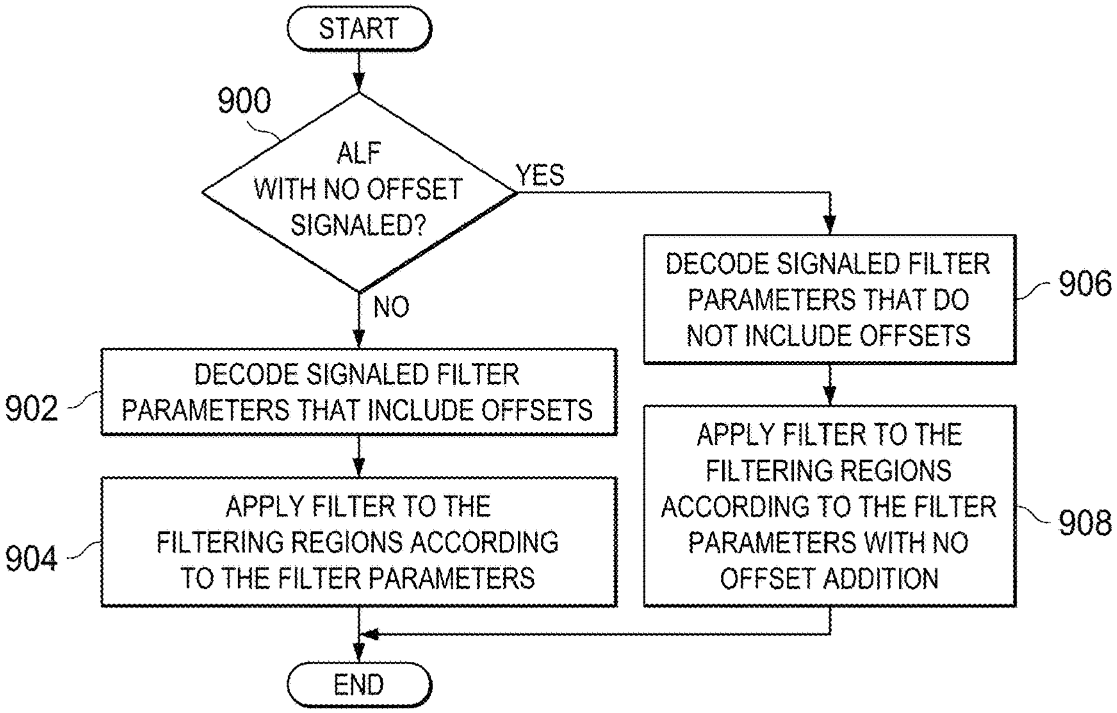

FIG. 9 is a flow diagram of a method for adaptive loop filtering in a decoder assuming that the encoder explicitly signals with ALF with no offset is used. If ALF with no offset is signaled 900, the decoder decodes 906 any signaled parameters sets for a picture assuming that the parameter sets do not include offsets. The decoder then applies 908 the ALF filter to the filtering regions of the reconstructed picture according to the signaled filter parameters with no offset addition. More specifically, for each filtering region for which a parameter set is signaled, the decoder applies the ALF filter to pixels of the filtering region according to Eq. 4 without the addition of the offset using the signaled parameters (coefficients) for that region.

If ALF with no offset is not signaled 900, the decoder decodes 902 any signaled parameters sets for a picture assuming that the parameter sets include offsets. The decoder then applies 904 the ALF filter to the filtering regions of the reconstructed picture according to the signaled filter parameters with offset addition. More specifically, for each filtering region for which a parameter set is signaled, the decoder applies the ALF filter to pixels of the filtering region according to Eq. 2 using the signaled parameters (coefficients and offset) for that region.

Figure 10:
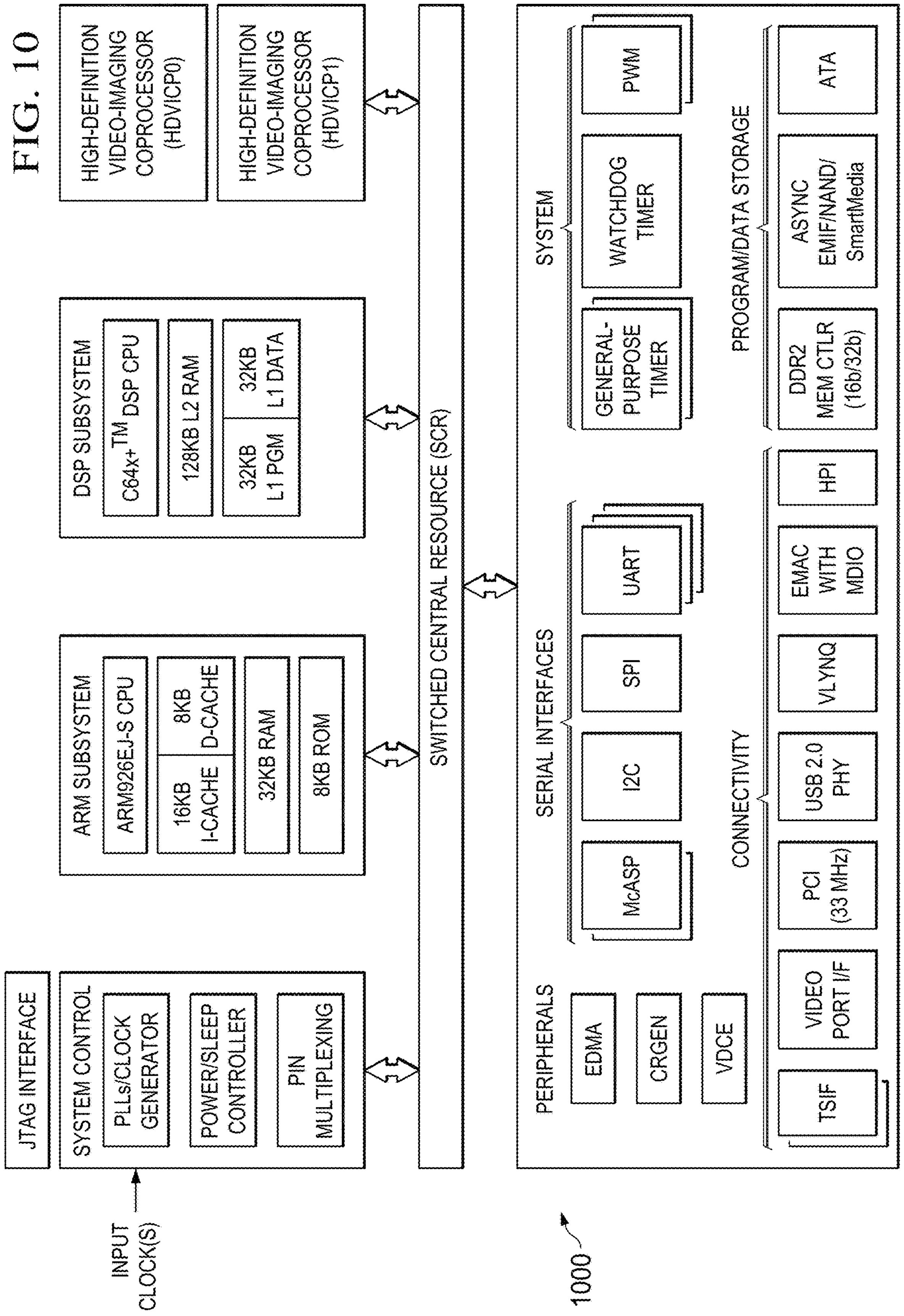
FIG. 10 is a block diagram of an illustrative digital system.

FIG. 10 is a block diagram of an example digital system suitable for use as an embedded system that may be configured to perform ALF filtering as described herein during encoding of a video stream and/or ALF filtering during decoding of an encoded video bit stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1000 is a programmable platform designed to meet the processing needs of applications such as video encode/decode/transcode/transrate, video surveillance, video conferencing, set-top box, medical imaging, media server, gaming, digital signage, etc. The SoC 1000 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1000 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 1000, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1000 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 10, the SoC 1000 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 1000 may be configured to perform ALF filtering during video encoding and/or ALF filtering during decoding of an encoded video bit stream using methods described herein. For example, the coding control of the video encoder of FIG. 6 may be executed on the DSP subsystem or the ARM subsystem and at least some of the computational operations of the block processing, including the intra-prediction and inter-prediction of mode selection, transformation, quantization, and entropy encoding may be executed on the HDVICP coprocessors. At least some of the computational operations of the ALF filtering during encoding of a video stream may also be executed on the HDVICP coprocessors. Similarly, at least some of the computational operations of the various components of the video decoder of FIG. 7, including entropy decoding, inverse quantization, inverse transformation, intra-prediction, and motion compensation may be executed on the HDVICP coprocessors. Further, at least some of the computational operations of the ALF filtering during decoding of an encoded video bit stream may also be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, some embodiments have been described herein according to region-based ALF using sixteen LCU-aligned regions. One of ordinary skill in the art will understand that more or few regions may be used and/or the regions may not be LCU-aligned.

In another example, embodiments of ALF with no offset have been described herein in the context of region-based filtering. One of ordinary skill in the art will understand embodiments may also be used in block-based ALF techniques in which the variance of a block is used to select the filter parameters for the block.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

The invention claimed is:

1. A system comprising:

a decoder configurable to:

determine, from a bit stream, that sample adaptive offset (SAO) filtering is to be applied to a first image;

apply adaptive loop filtering (ALF) to the first image without decoding a first ALF offset in the bit stream for the first image;

determine that SAO filtering is to not be applied to a second image;

decode a second ALF offset for the second image; and apply ALF to the second image using the second ALF offset; and a display coupled to the decoder and configurable to display the first image and display the second image.

2. The system of claim 1, wherein the decoder is configurable to:

decode a first set of coefficients for the first image;

apply ALF to the first image using the first set of coefficients;

decode a second set of coefficients for the second image; and apply ALF to the second image using the second ALF offset and the second set of coefficients.

3. The system of claim 1, wherein to apply ALF to the first and second images, the decoder is configurable to apply finite impulse response filters to the first and second images.

4. The system of claim 3, wherein to apply the finite impulse response filters to the first and second images, the decoder is configurable to apply symmetric two-dimensional finite impulse response filters to the first and second images.

5. The system of claim 1, wherein the display includes a light emitting diode display configurable to display the first image and display the second image.

6. The system of claim 1, wherein the display includes a liquid crystal display configurable to display the first image and display the second image.

7. A system comprising:

a receiver configurable to receive a bit stream; and a decoder coupled to the receiver and configurable to:

determine, from the bit stream, that sample adaptive offset (SAO) filtering is to be applied to a first image;

apply adaptive loop filtering (ALF) to the first image without decoding a first ALF offset in the bit stream for the first image;

determine that SAO filtering is to not be applied to a second image;

decode a second ALF offset for the second image; and apply ALF to the second image using the second ALF offset.

8. The system of claim 7, wherein the decoder is configurable to:

decode a first set of coefficients for the first image;

apply ALF to the first image using the first set of coefficients;

decode a second set of coefficients for the second image; and apply ALF to the second image using the second ALF offset and the second set of coefficients.

9. The system of claim 7, wherein to apply ALF to the first and second images, the decoder is configurable to apply finite impulse response filters to the first and second images.

10. The system of claim 9, wherein to apply the finite impulse response filters to the first and second images, the decoder is configurable to apply symmetric two-dimensional finite impulse response filters to the first and second images.

11. The system of claim 7, further comprising a light emitting diode display coupled to the decoder and configurable to display the first image and display the second image.

12. The system of claim 7, further comprising a liquid crystal display coupled to the decoder and configurable to display the first image and display the second image.

13. A method comprising:

determining, from a bit stream, that sample adaptive offset (SAO) filtering is to be applied to a first image;

applying adaptive loop filtering (ALF) to the first image without decoding a first ALF offset in the bit stream for the first image;

determining that SAO filtering is to not be applied to a second image;

decoding a second ALF offset for the second image;

applying ALF to the second image using the second ALF offset; and displaying the first image and display the second image.

14. The method of claim 13, further comprising:

decoding a first set of coefficients for the first image, wherein applying ALF to the first image uses the first set of coefficients; and decoding a second set of coefficients for the second image, wherein applying ALF to the second image uses the second ALF offset and the second set of coefficients.

15. The method of claim 13, wherein applying ALF to the first and second images comprises applying finite impulse response filters to the first and second images.

16. The method of claim 15, wherein applying the finite impulse response filters to the first and second images comprises applying symmetric two-dimensional finite impulse response filters to the first and second images.

17. The method of claim 13, wherein displaying the first and second images is via a light emitting diode display.

18. The method of claim 13, wherein displaying the first and second images is via a liquid crystal display.

19. A system comprising:

a decoder configurable to:

decode a flag from a bit stream, wherein the flag indicates whether adaptive loop filtering (ALF) with an offset is used;

decode a parameter set for a picture from the bit stream;

apply ALF to at least a first portion of the picture using the parameter set without using the offset in response to determining that the flag indicates ALF without the offset is used; and apply ALF to at least a second portion of the picture using the offset signaled in the parameter set in response to determining that the flag indicates ALF with the offset is used; and a display configurable to display the picture.

20. The system of claim 19, wherein the decoder is configurable to apply ALF apply ALF to at least the first portion of the picture without addition of the offset.

* * * * *